United States Patent Office 3,052,695
Patented Sept. 4, 1962

3,052,695
MANUFACTURE OF 4 - AMINO - 2 - CHLORO-5-(METHYL-SULFAMYL)-BENZENESULFONAMIDE
Warren J. Close, Waukegan, Ill., assignor to Abbott Laboratories, North Chicago, Ill., a corporation of Illinois
No Drawing. Filed Aug. 8, 1960, Ser. No. 47,915
3 Claims. (Cl. 260—397.7)

The present invention is concerned with a new and improved method for the manufacture of 4-amino-2-chloro-5-(methylsulfamyl) - benzenesulfonamide having the formula

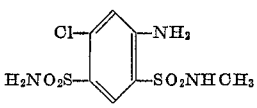

This compound is an important intermediate in the manufacture of benzothiadiazine-1,1-dioxides corresponding to the formula

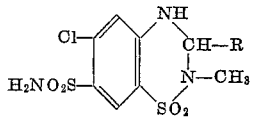

wherein R represents hydrogen, lower alkyl or halolower-alkyl which are valuable diuretic and hypotensive agents. More specifically, 4-amino-2-chloro-5-(methylsulfamyl)-benzenesulfonamide can be reacted with an aldehyde of the formula RCHO as described in J.A.C.S. 82, 1132 (1960) to obtain the corresponding benzothiadiazine-1,1-dioxides.

The classical method for preparing 4-amino-2-chloro-5-(methylsulfamyl)-benzenesulfonamide involves the cyclization of disulfamylchloroaniline with urea to form the corresponding 3-keto derivative which is thereafter alkylated and hydrolyzed to form the desired benzenesulfonamide. As can readily be seen, such method involves many steps and is both time-consuming and cumbersome. Thus, it would be advantageous to provide a method which is simpler and more economical to perform.

It is one object of this invention to provide a new, improved and more direct method for the preparation of 4 - amino - 2 - chloro-5-(methylsulfamyl)-benzenesulfonamide. Another object of the invention is to provide a method for the preparation of 4-amino-2-chloro-5-(methylsulfamyl)-benzenesulfonamide which circumvents the intermediate prior art 3-keto derivative and likewise avoids the additional alkylation and hydrolysis steps of that method. Other objects will become apparent throughout the following specification and appended claims.

The new and improved process comprises reacting chlorosulfonic acid with 3-carboxy-6-chloro-2-methyl-7-methylsulfamyl - 3,4-dihydro-1,2,4-benzothiadiazine-1,1-dioxide at a temperature of from 100° C. to about 150° C. for a sufficient period of time to produce the intermediate 4 - amino-2-chloro-5-(methylsulfamyl)-benzenesulfonylchloride which is thereafter reacted with liquid or aqueous ammonia to obtain the desired 4-amino-2-chloro-5-(methylsulfamyl)- benzenesulfonamide. Thus, the reaction can be readily illustrated by the following chemical equations:

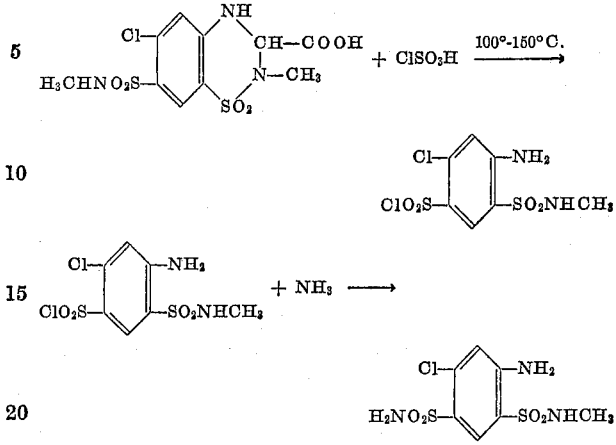

In order to obtain high yields of the desired product, it is critical and essential that the first step of the reaction be carried out at a temperature above 100° C. If the first step of the reaction is carried out below 100° C., the only compound formed is 5-chloro-2,4-bis-(methylsulfamyl)-aniline. Demethylation of this substance by chlorosulfonic acid results in the removal of both methylamino groups.

The rate at which the demethylamination takes place has been found to vary directly with the temperature employed, the longer contacting times being employed at the lower temperatures. Various temperatures above 100° C. can be used, but the higher the temperature the shorter the reaction time. In general, the reaction is complete in about 15 to 120 minutes. More specifically, it has been found that at a temperature of 115° C., it requires from 1 to 2 hours to complete the demethylamination. At 135° C., about 30 to 45 minutes is necessary whereas at 150° C. the reaction is complete in 15 minutes. Temperatures substantially greater than 150° C. are not required and are undesirable from the standpoint of economy and yield. In practice, a relatively high temperature for short heating periods is preferable to low temperatures for long time intervals.

In carrying out the method of the present invention, the 3 - carboxy-6-chloro-2-methyl-7-methylsulfamyl - 3,4-dihydro-1,2,4-benzothiadiazine-1,1-dioxide is mixed with a large stoichiometric excess (on the order of 5 to 20 fold) of chlorosulfonic acid and the resulting mixture maintained for a period of time under the described temperature conditions. In a convenient method of operation, the reaction is carried out at 135° C. plus or minus 5° C. for about 30 minutes. The reaction mixture is then cooled and poured on ice. The solid which precipitates is filtered, washed with water and thereafter added to a stoichiometric excess of liquid ammonia or aqueous ammonia. The unreacted ammonia is evaporated and the residue acidified with aqueous hydrochloric acid. Upon filtration, the desired 4-amino-2-chloro-5-(methylsulfamyl)-benzenesulfonamide is obtained as a solid which can be further purified if desired by recrystallization from water before reaction with an aldehyde to obtain the corresponding 2 - methyl - 3 - substituted-6-chloro-7-sulfamyl-3,4-dihydro-1,2,4-benzothiadiazine-1,1-dioxide.

EXAMPLE 1

*4-Amino-2-Chloro-5-(Methylsulfamyl)-Benzenesulfonamide*

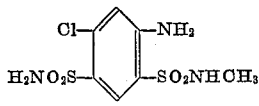

A mixture of 1.94 grams (0.005 mole) of 3-carboxy-6-chloro-2-methyl-7-methylsulfamyl-3,4-dihydro-1,2,4-benzothiadiazine-1,1-dioxide and 6.6 milliliters (0.10 mole) of chlorosulfonic acid was heated on an oil bath at 135°–140° C. for 30 minutes. The reaction mixture was then cooled and poured on ice. The solid which precipitated was separated by filtration and washed with water to remove the excess acid. The solid was then reacted with 25 milliliters of liquid ammonia and the excess ammonia allowed to evaporate. After acidification of the residue with aqueous hydrochloric acid, the desired 4-amino-2-chloro-5-(methylsulfamyl)-benzenesulfonamide was separated by filtration and upon recrystallization from water was found to melt at 191°–193° C. The yield was 67% of theory.

EXAMPLE 2

In a manner similar to that described in Example 1 employing the same reactants and in the same proportions as previously described, the first step of the reaction was carried out in a series of runs which employed different temperatures and different reaction times and the intermediate formed reacted with ammonia to obtain 4-amino-2-chloro-5-(methylsulfamyl)-benzenesulfonamide in the yields shown in the following table.

| Run No. | Reaction Temp. in ° C. | Time of Reaction in Minutes | Percent Yield of Product |
| --- | --- | --- | --- |
| 1 | 115 | 60 | 46 |
| 2 | 115 | 90 | 62 |
| 3 | 115 | 120 | 52 |
| 4 | 135 | 30 | 70 |
| 5 | 135 | 45 | 60 |
| 6 | 151 | 15 | 70 |

These data clearly show that optimum yields are obtained when the first step of the reaction is carried out at the higher reaction temperature of 135°–151° C. while employing reaction times of from 15 to 30 minutes.

The 3-carboxy-6-chloro-2-methyl-7-methylsulfamyl-3,4-dihydro-1,2,4-benzothiadiazine-1,1-dioxide employed as a starting material in the process of the present invention can be readily prepared by refluxing one molecular proportion of 2,4-bis-(methylsulfamyl)-5-chloroaniline and two molecular proportions of methyl dimethoxyacetate in water solution for about 2 hours. The hot reaction mixture is filtered and upon cooling the filtrate, the desired product precipitates as a white crystalline solid which melts at 171°–173° C.

What I claim is:

1. A method for the preparation of 4-amino-2-chloro-5-(methylsulfamyl)-benzenesulfonamide which comprises (a) reacting 3-carboxy-6-chloro-2-methyl-7-methylsulfamyl-3,4-dihydro-1,2,4-benzothiadiazine-1,1-dioxide with a stoichiometric excess of chlorosulfonic acid at a temperature of at least 100° C. and (b) further reacting the intermediate thus formed with a stoichiometric excess of ammonia and recovering the 4-amino-2-chloro-5-(methylsulfamyl)-benzenesulfonamide thus formed from the reaction mixture.

2. A method as claimed in claim 1 in which the first step of the reaction is carried out at a temperature of from 135° to 150° C. and the intermediate thus formed is further reacted with liquid ammonia.

3. A method as claimed in claim 2 in which one molecular proportion of 3-carboxy-6-chloro-2-methyl-7-methylsulfamyl-3,4-dihydro-1,2,4-benzothiadiazine-1,1-dioxide is reacted with about twenty molecular proportions of chlorosulfonic acid.

References Cited in the file of this patent

UNITED STATES PATENTS

| 2,910,473 | Novello | Oct. 27, 1959 |
| 2,965,675 | Novello | Dec. 20, 1960 |

OTHER REFERENCES

Novello et al.: "Journ. Org. Chemistry," vol. 25, page 975 (1960).

Baer et al.: Journ. Pharmacol. and Exp. Therapeutics, vol. 125, page 296 (1959).